(12) United States Patent
Maeshiro (10) Patent No.: US 11,634,106 B2
(45) Date of Patent: Apr. 25, 2023

(54) ELECTRIC VEHICLE WITH CLEANING DEVICE

(71) Applicant: Honda Motor Co., Ltd., Tokyo (JP)

(72) Inventor: Shinji Maeshiro, Cypress, CA (US)

(73) Assignee: Honda Motor Co., Ltd., Tokyo (JP)

(*) Notice: Subject to any disclaimer, the term of this patent is extended or adjusted under 35 U.S.C. 154(b) by 503 days.

(21) Appl. No.: 16/926,248

(22) Filed: Jul. 10, 2020

(65) Prior Publication Data
US 2020/0361422 A1    Nov. 19, 2020

Related U.S. Application Data (63) Continuation of application No. 16/100,754, filed on Aug. 10, 2018, now Pat. No. 10,744,980.

(51) Int. Cl.
| | | |
|---|---|---|
| *B60S 1/64* | (2006.01) | |
| *A47L 7/00* | (2006.01) | |
| *B60H 1/00* | (2006.01) | |
| *B60H 1/14* | (2006.01) | |

(52) U.S. Cl.
CPC .............. *B60S 1/64* (2013.01); *A47L 7/0076* (2013.01); *B60H 1/00028* (2013.01); *B60H 1/143* (2013.01); *B60H 2001/00214* (2013.01)

(58) Field of Classification Search
CPC ..... B60S 1/64; A47L 7/0076; B60H 1/00028; B60H 1/143; B60H 2001/00214
See application file for complete search history.

(56) References Cited

U.S. PATENT DOCUMENTS

| | | | |
|---|---|---|---|
| 3,284,836 A | | 11/1966 | Ioppolo |
| 3,841,553 A | * | 10/1974 | Taylor ................ B60H 1/00007 15/313 |
| 4,546,617 A | | 10/1985 | Suzuki |
| 5,450,894 A | * | 9/1995 | Inoue .................. B60H 1/00842 454/907 |
| 5,921,100 A | * | 7/1999 | Yoshinori ............ B60N 2/5657 219/202 |
| 6,082,630 A | | 7/2000 | Bohrer |
| 6,105,667 A | * | 8/2000 | Yoshinori .......... B60H 1/00285 219/202 |
| 7,559,610 B1 | * | 7/2009 | Hong Min ............. A47C 7/744 297/217.3 |
| 8,276,831 B2 | | 10/2012 | Rutherford |
| 10,744,980 B2 | * | 8/2020 | Maeshiro ............... B60H 1/143 |
| 10,850,652 B2 | * | 12/2020 | Lee ...................... B60N 2/5628 |
| 2004/0089734 A1 | | 5/2004 | Martin |

(Continued)

FOREIGN PATENT DOCUMENTS

| | | | | |
|---|---|---|---|---|
| DE | 102010025758 A1 | * | 1/2012 | ......... B60H 1/00271 |
| EP | 1088696 A2 | * | 4/2001 | ......... B60H 1/00021 |
| JP | 2587374 Y2 | * | 12/1998 | |

*Primary Examiner* — Marc Carlson
(74) *Attorney, Agent, or Firm* — Aaron Fong; American Honda Motor Co., Inc.

(57) ABSTRACT

An electric vehicle with a cleaning device includes an electric motor, a cleaning device connected with a pipe installed in a vehicle cabin, a first clutch that connects and disconnects the electric motor with an axle of wheels of the vehicle, a second clutch that connects and disconnects the electric motor with the cleaning device, a control unit that controls one of the first clutch and the second clutch to selectively connect one of the cleaning device and the axle with the electric motor and activate the cleaning device.

19 Claims, 10 Drawing Sheets

(56) References Cited

U.S. PATENT DOCUMENTS

| | | |
|---|---|---|
| 2007/0262180 A1 | 11/2007 | Adams |
| 2007/0284457 A1 | 12/2007 | Shank et al. |
| 2009/0019662 A1 | 1/2009 | Yona et al. |
| 2010/0174452 A1 | 7/2010 | Leinung |
| 2012/0247747 A1 | 10/2012 | DiGasbarro et al. |
| 2013/0062260 A1 | 3/2013 | Kiyono et al. |
| 2013/0270249 A1 | 10/2013 | Suzuki et al. |
| 2016/0152112 A1 | 6/2016 | Stetler et al. |
| 2017/0028837 A1* | 2/2017 | Welschoff ............... B60L 58/12 |
| 2017/0082184 A1* | 3/2017 | Gutteridge ............ B60K 17/28 |
| 2017/0210352 A1 | 7/2017 | Stauffer et al. |
| 2017/0210353 A1* | 7/2017 | Stauffer .................. B60N 2/58 |
| 2019/0077229 A1* | 3/2019 | Nakamura ............ B60H 3/024 |
| 2019/0184944 A1* | 6/2019 | Kim ......................... A47L 5/38 |
| 2020/0047720 A1* | 2/2020 | Maeshiro ............... B60H 1/143 |

* cited by examiner

ELECTRIC VEHICLE WITH CLEANING DEVICE

RELATED DISCLOSURE

This disclosure is a continuation of U.S. application Ser. No. 16/100,754 filed Aug. 10, 2018 titled Electric Vehicle with Cleaning Device, which is hereby incorporated by reference in its entirety.

TECHNICAL FIELD

The present disclosure relates to an electric vehicle with a cleaning device. More particularly, the present disclosure relates to an electric vehicle with an integrated cleaning device.

BACKGROUND

Ride hailing services are increasingly popular. Ride hailing services m a user with a local driver who is available to take the user from point A to point B. The local driver uses their own personal vehicle to transport the user. In some instances, it would be desirable to use autonomous vehicles instead of driver-based vehicles for the transportation. In such instances, however, where a driver is not present in the vehicle, it would be difficult for the autonomous vehicle to keep a vehicle cabin clean because nobody monitors the cleanliness of the vehicle cabin.

It is known to provide a cleaning system for a vehicle cabin that monitors a cleanliness of a vehicle cabin and automatically activates cleaning devices installed in the vehicle cabin such as a vacuum or a blower in order to remove dust or the like, when the vehicle cabin is determined to be not clean by sensors installed in the vehicle cabin. This allows the vehicle cabin to be kept clean even without a driver.

However, motors used for the cleaning devices in the prior system would not necessarily have enough power to remove the dust across the vehicle cabin because the cleaning devices are secured in certain places and thus the cleaning device may be difficult to remove the dust far away from the cleaning device with weak power by a dedicated motor, although the cleaning device could remove the dust near the cleaning devices.

One solution for the issue above is to make a dedicated motor of cleaning devices larger to get enough power. However, generally each cleaning device has a motor and making the dedicated motors larger would occupy space in the vehicle cabin.

Accordingly, it would be advantageous to provide an electric vehicle with a cleaning device that allows a vehicle cabin to be kept clean without making a motor of a cleaning device larger.

SUMMARY

In accordance with one embodiment, an electric vehicle with a cleaning device may include a cleaning device connected with a pipe installed in a cabin of the electric vehicle, a first clutch that connects and disconnects an electric motor with an axle of wheels of the electric vehicle, a second clutch that connects and disconnects the electric motor with the cleaning device, a control unit that controls one of the first clutch and the second clutch to selectively connect one of the cleaning device and the axle with the electric motor.

In accordance with another embodiment, a method for cleaning a cabin of an electric vehicle may include disconnecting an electric motor with an axle of wheels of the electric vehicle through a first clutch, connecting the electric motor with a cleaning device through a second clutch, and activating the cleaning device with the electric motor.

In accordance with yet another embodiment, a cleaning system for a cabin of an electric vehicle may include a cleaning device connected with a pipe installed in the cabin, a clutch that connects and disconnects a electric motor of the electric vehicle with the cleaning device, and a cleaning control unit that controls the clutch to connect or disconnect the electric motor with the cleaning device and sends a signal to a vehicle control unit to connect or disconnect the electric motor with an axle of the electric vehicle.

The figures depict various views of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
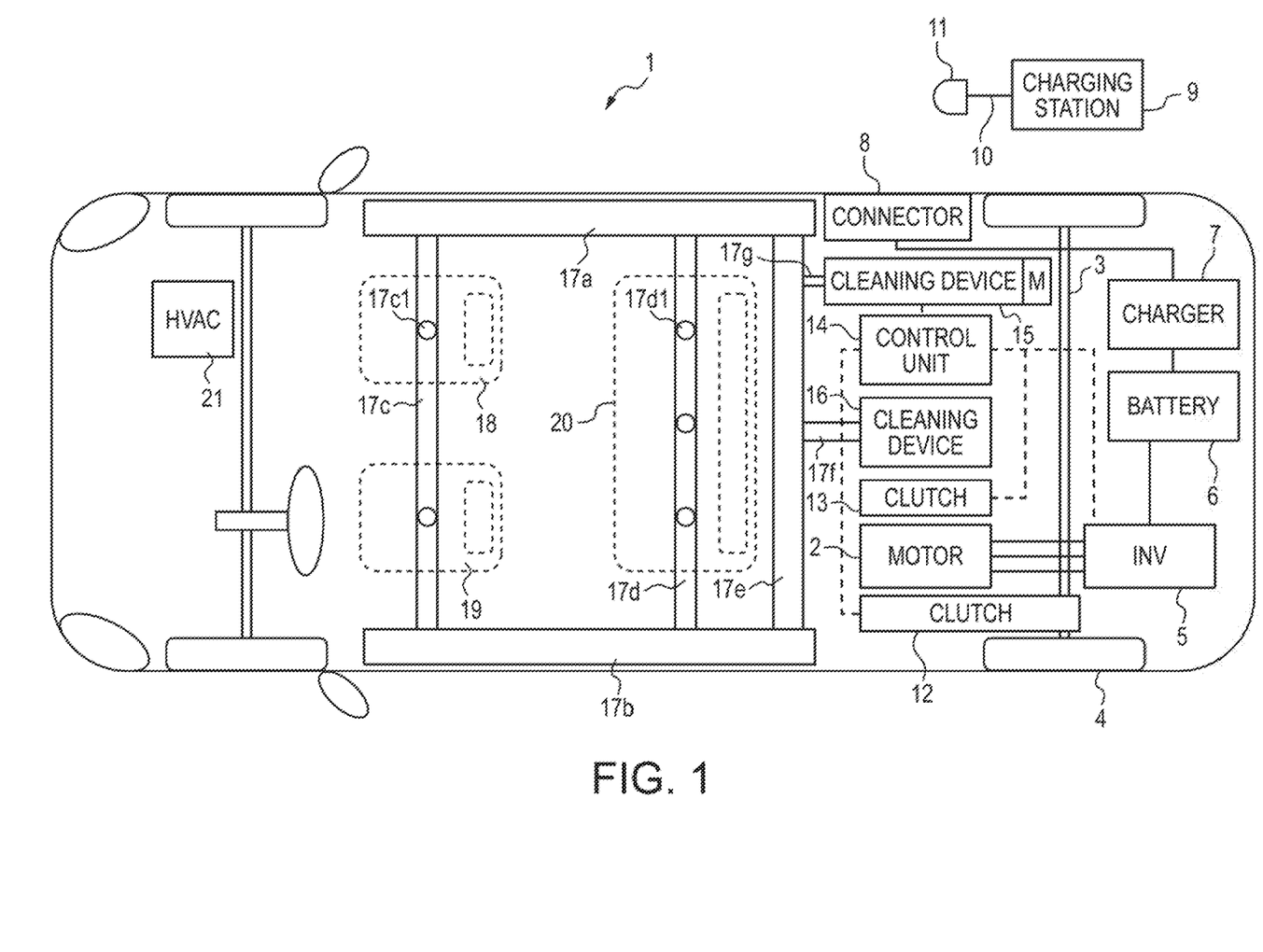
FIG. 1 is an overall diagram of an electric vehicle regarding the present disclosure.

FIG. 1 shows an overall diagram of an electric vehicle 1. The electric vehicle 1 may be autonomous. The electric vehicle 1 may be any type of electric vehicle with an electric motor such as a hybrid electric vehicle, a battery electric vehicle or fuel cell electric vehicle. The electric vehicle 1 includes a electric motor 2, an inverter 5 electrically connected with the electric motor 2, a battery 6 electrically connected with the inverter 5, an on-board charger 7 electrically connected with the battery 6, and a connector 8 that electrically connects the on-board charger 7 with a charging station 9 through a charging cable 10 with a charging plug 11. The electric vehicle 1 also includes a first clutch 12 connecting the electric motor 2 with a rear axle 3 having rear wheels 4 on its end, a second clutch 13 connecting the electric motor 2 with a cleaning device 16, and a control unit 14 electrically connected with the first clutch 12, the second clutch 13, and the inverter 5. The first clutch 12 may be connected with the rear axle 3 via a transmission T. The electric vehicle 1 may include auxiliary cleaning device 15 with or without a dedicated motor M. The electric vehicle 1 also includes a plurality of pipes 17a-g connected with the cleaning device 16 and the auxiliary cleaning device 15. The electric vehicle 1 also includes front passenger seats 18, 19 and one or more rear passenger seats 20. Of course, the electric vehicle 1 includes other components such as a steering wheel, dashboard, pedals, infotainment system and so forth. However, for the sake of the explanation focusing on features of the disclosure, the other components are omitted.

The electric motor 2 propels the electric vehicle 1. More specifically, the electric motor 2 is connected with the axle 3 of the electric vehicle 1 via the first clutch 12 so that the axle 3 with the rear wheels 4 on both ends can rotate as the electric motor 2 rotates to propel the electric vehicle 1. The electric motor 2 may be any type of motor and be an AC motor or a DC motor.

The inverter 5 converts direct current into alternative current and controls amount of the electric current coming from the battery 6 in order to control rotation of the electric motor 2.

The battery 6 supplies electric current to the electric motor 2 via the inverter 5. The battery 6 may be a lithium ion battery, nickel hydrogen battery or so forth. The battery 6 may supply electric current with high voltage such as 200V so that the battery can supply to the electric motor 2 enough power to propel the electric vehicle 1.

The on-board charger 7 includes an AC/DC converter connected with a DC/DC converter. The AC/DC converter is connected with the connector 8 to be supplied with AC power derived from the charging station 9 during charging of the battery. The DC/DC converter is connected with the battery 6.

Figure 2:
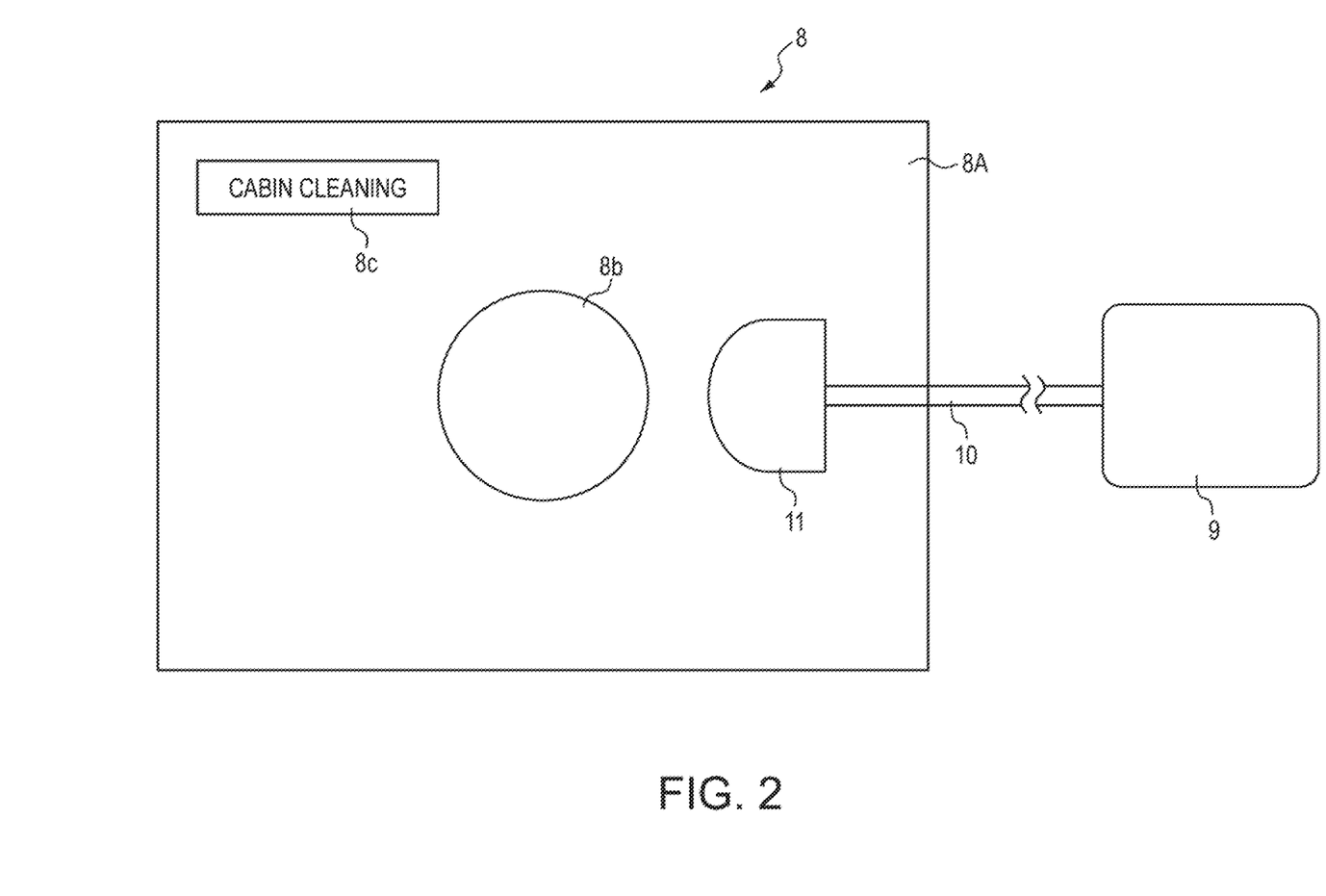
FIG. 2 is a schematic view of a connector of an electric vehicle.
Figure 3:
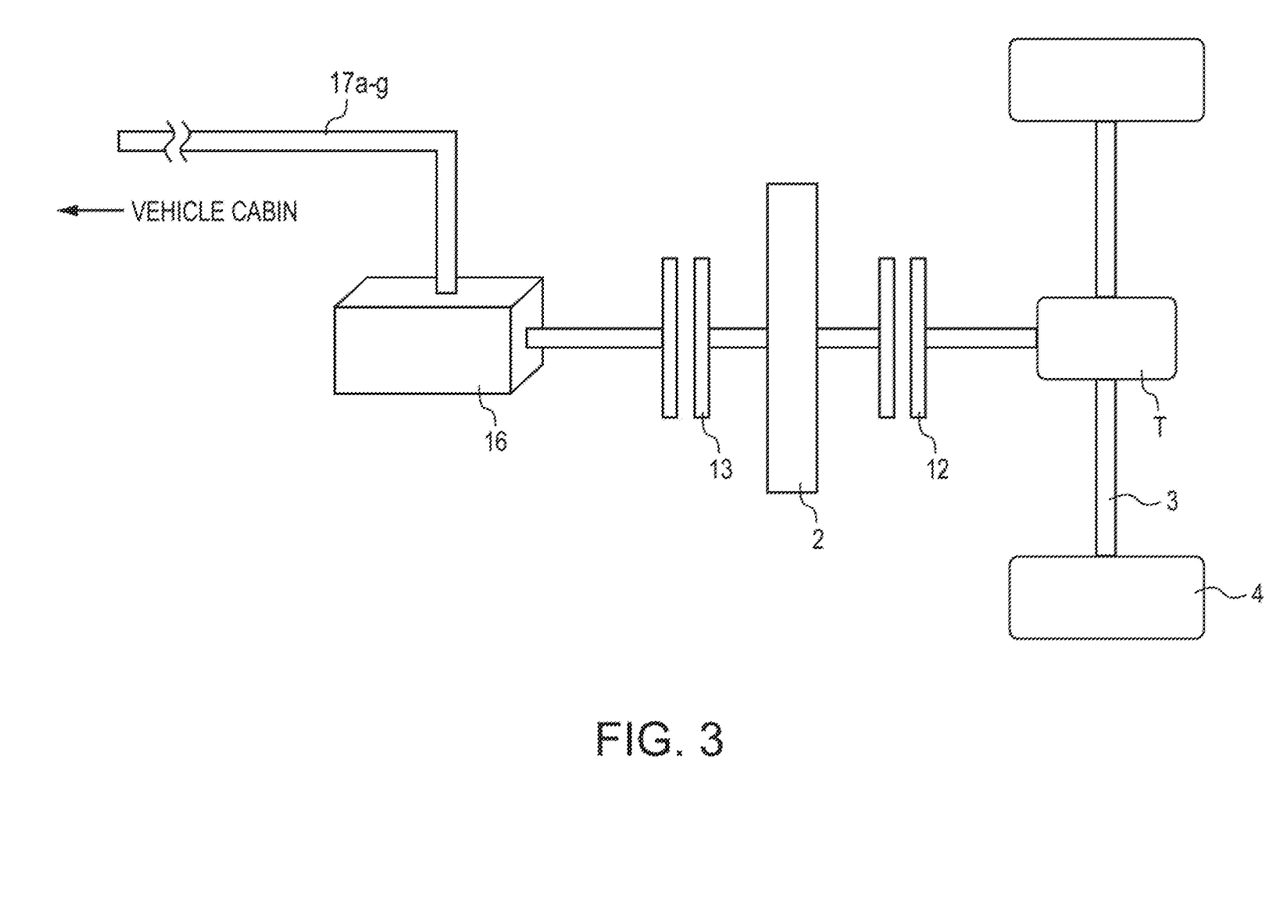
FIG. 3 is a schematic view of relationship among a cleaning device, an electric motor, axle, a first clutch and a second clutch.

The connector 8 is installed on an exterior of the electric vehicle 1. The connector 8 receives the charging plug 11 of the charging station 9. FIG. 2 shows an example for the connector 8. The connector 8 includes a base plate 8a and a receptacle 8b for the charging plug 11 of the charging station 9. The connector 8 also include a physical button 8c for requesting a cleaning process for a vehicle cabin. The cleaning process means a process for cleaning a vehicle cabin.

Referring back to FIG. 1, the first clutch 12 selectively connects or disconnects the electric motor 2 directly or indirectly with the axle 3 by a first actuator (not shown) or any method known in the art. When the first clutch 12 connects the electric motor 2 with the axle 3, the axle 3 rotates while the electric motor 2 rotates. When the first clutch 12 disconnects the electric motor 2 with the axle 3, the axle 3 does not rotate while the electric motor 2 rotates. The first clutch 12 may be integrated with the electric motor 2.

The second clutch 13 selectively connects and disconnects the electric motor 2 directly or indirectly with the cleaning device 16 by a second actuator (not shown) or any method known in the art. When the second clutch 13 connects the electric motor 2 with the cleaning device 16, the cleaning device 16 is activated while the electric motor 2 rotates. When the second clutch 13 disconnects the electric motor 2 with the cleaning device 16, the cleaning device 16 is deactivated. The second clutch 13 may be integrated with the electric motor 2.

The control unit 14 controls the first clutch 12 to connect or disconnect the electric motor 2 with the rear axle 3. The control unit 14 also controls the second clutch 13 to connect or disconnect the electric motor 2 with the cleaning device 16. The control unit 14 also controls the inverter 5 to adjust the amount of the electric current from the battery 6 to the electric motor 2. One or more control units 14 may be used. In such instances, multiple control units may communicate with each other and work in cooperation with each other. The control unit 14 may be installed inside of the vehicle cabin. The control unit 14 may get power from a low voltage battery (not shown) installed in the electric vehicle 1.

The cleaning device 16 is activated by the electric motor 2 through the second clutch 13 while the second clutch 13 connects the electric motor 2 with the cleaning device 16. The cleaning device 16 may be a blower, a vacuum or any cleaning device that needs a motor. In addition to the cleaning device 16, the auxiliary cleaning device 15 with or without a dedicated motor M such as a spraying device, another vacuum or another blower may be installed. The auxiliary cleaning device 15 may get power from a low voltage battery (not shown) installed in the electric vehicle 1. The cleaning device 16 may be installed outside of the vehicle cabin. The cleaning device 16 may have multiple functions as a blower and a vacuum by changing direction of the electric current supplied to the electric motor 2. More specifically the cleaning device 16 functions as a blower when the electric current goes in one direction, while the cleaning device 16 functions as a vacuum when the electric current goes in the other direction. The inverter 5 can change the direction of electric current according to known prior art devices or methods. The cleaning device 16 is connected with the pipe 17 on its one end and is connected with outside of the electric vehicle 1 on its other end.

The pipes 17 are disposed inside of the vehicle cabin, for example on a floor of a vehicle cabin or on a roof of the vehicle cabin. The pipes 17 are connected with the cleaning device 16 so that the cleaning device 16 can vacuum air, dust, water, rubbish or so forth through the pipes 17 or so that the cleaning device 16 can blow air, dust, water, rubbish or so forth through the pipes 17. The pipes 17 may include a first pipe 17a, a second pipe 17b, a third pipe 17c, a fourth pipe 17d, fifth pipe 17e, a sixth pipe 17f and a seventh pipe 17g. The first pipe 17a and the second pipe 17b extend in the longitudinal direction of the electric vehicle 1 and are disposed at both ends in a width direction of the electric vehicle 1. The third pipe 17c, the fourth pipe 17d and the fifth pipe 17e extend in the width direction of the electric vehicle 1 and are disposed in the longitudinal direction of the electric vehicle 1. Both ends of the third pipe 17c, the fourth pipe 17d and the fifth pipe 17e are connected with the first pipe 17a and the second pipe 17b. The third pipe 17c and the fourth pipe 17d include several apertures 17c1, 17d1 facing the front seats 18 and the rear seat 19 respectively. The third pipe 17c and the fourth pipe 17d also include apertures 17c2, 17d2 on faces in the longitudinal direction (see FIG. 2(b)). The sixth pipe 17f is connected with the fifth pipe 17e on its one end and the cleaning device 16 on its other end. The seventh pipe 17g is connected with the fifth pipe 17e on its one end and the auxiliary cleaning device 15 on other end. Existing ducts used for a heating, ventilation and air conditioning device (HVAC 21) may be commonly used as the pipes.

Each of the front seats 18, 19 and the rear seats 20 includes a seat cushion and a seat back. The seat cushion and the seat back may be made of material that does not absorb water. Such material may be metal, plastic, or fabric with hydrophobic coating. The seat cushion or the seat back includes multiple small holes connected with the third pipe 17c and the fourth pipe 17d. The seat cushion and/or the seat back may be made of mesh in order to include the small holes on the seat cushion or the seat back for example.

Figure 4A:
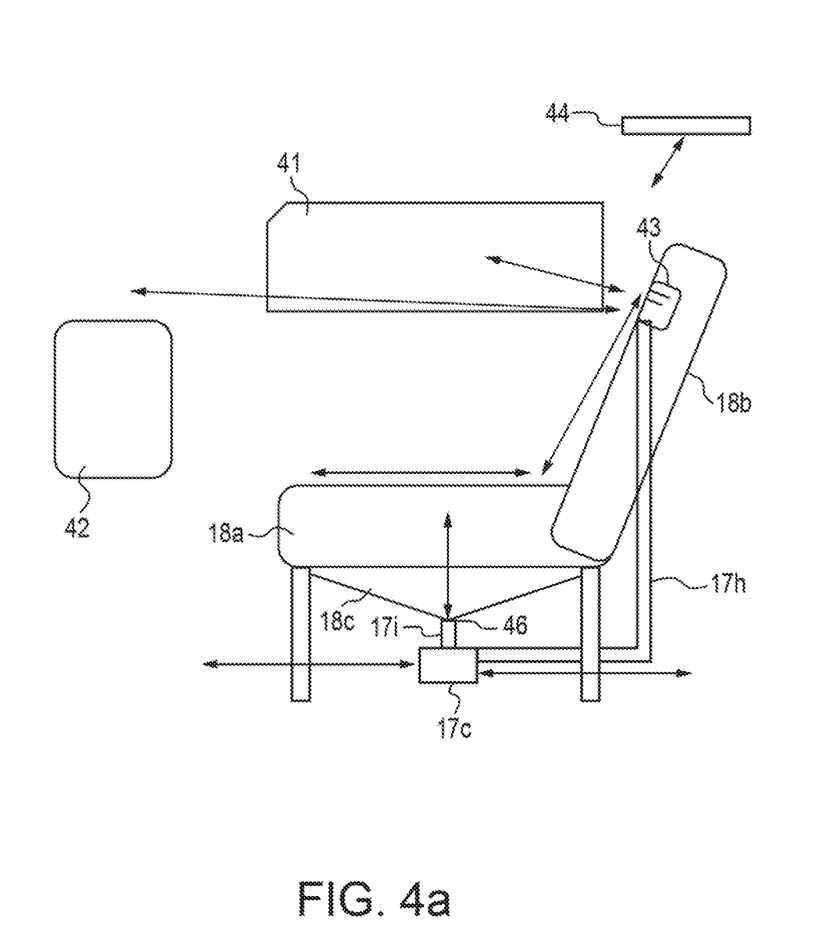
FIG. 4a is a side view of a front seat.
Figure 4B:
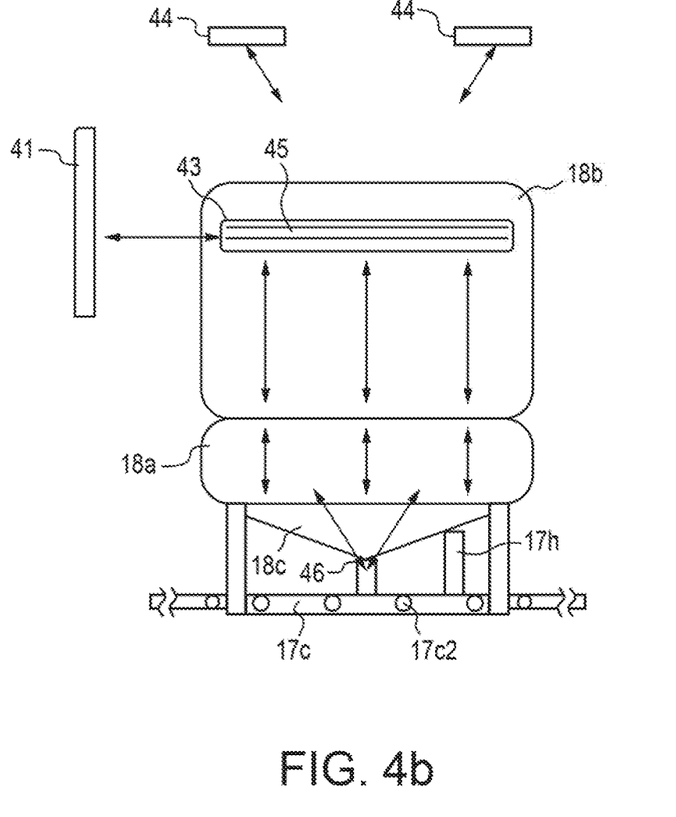
FIG. 4b is a front view of a front seat of the electric vehicle.

FIG. 4 shows a side view of the front seat 18 (FIG. 4(a)) and the front view of the front seat 18 (FIG. 4(b)). The front seat 18 includes the seat cushion 18a and the seat back 18b. The seat back 18b includes an outlet 43 connected with the third pipe 17c through an outlet path 17h. The seat outlet 43 includes louvers 45 to adjust the direction of flow, for example, for air, water, powder and so forth getting out of or getting into the outlet by the cleaning device 16. For example, by adjusting the louvers 45, the flow can reach a vehicle window 41 or a dashboard 42. The seat cushion 18a includes a funnel 18c to collect the flow from the seat cushion 18a and send it to the third pipe 17c through another outlet path 17i and the apertures 17c1. The front seat 19 and the rear seat 20 have substantially the same configuration as the front seat 18. A roof outlet 44 may be installed on the roof of the vehicle cabin. The roof outlet 44 may be connected with pipes 17a-g. The roof outlet 44 may function in the same way as the seat outlet 43. The third pipe 17c includes another apertures 17c2 facing the longitudinal direction of the electric vehicle 1.

Figure 5:
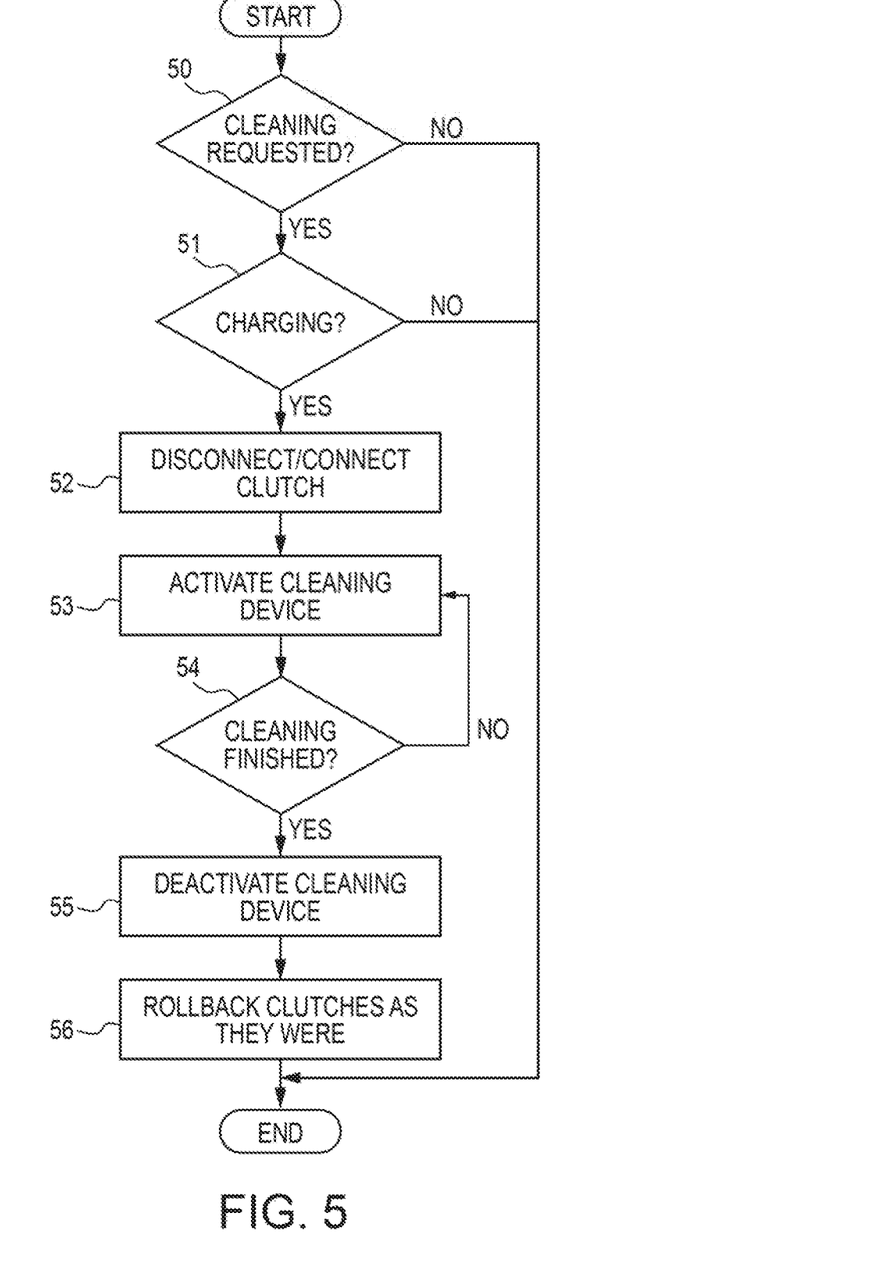
FIG. 5 is a flow chart of a first embodiment.

FIG. 5 shows a flow chart of a first embodiment. In step 50, the control unit 14 determines if a cabin cleaning is requested. If the control unit 14 determines that the cabin cleaning is requested, the process goes to step 51. If the control unit 14 determines that the cabin cleaning is not requested, the process ends. The control unit 14 may determine if the cabin cleaning is requested by checking if the cleaning request button 8c installed near the connector 8 is pressed (see FIG. 2). The control unit 14 may determine if the cabin cleaning is requested by checking if another cleaning request button (not shown) displayed on an infotainment system installed on the dashboard 42 of the electric vehicle 1 is pressed. The control unit 14 may determine if a telematics system embedded in the infotainment system receives the cleaning request from the user's mobile terminal such as a cell phone, smartphone, tablet computer, laptop computer, desktop computer and so forth. The control unit 14 may determine if the cabin cleaning is requested by checking if timing has come, in a case that a user makes a reservation to get the vehicle cabin cleaned in a certain timing such as once every two charging. The control unit 14 may determine if the cabin cleaning is requested by checking the charging plug 11 of the charging station 9 is inserted into the connector 8. The control unit 14 may determine if the cabin cleaning is requested based on the cleanliness of the electric vehicle, which is determined by sensors including on-board camera.

In step 51, the control unit 14 determines if the battery 6 of the electric vehicle 1 is being charged. The control unit 14 may determine if the battery 6 of the electric vehicle 1 is being charged by communicating with the charging station 9 through the connector 8, the charging cable 10 and the charging plug 11. The control unit 14 may determine if the battery 6 of the electric vehicle 1 is being charged by checking state of charge of the battery 6. If the control unit 14 determines the battery 6 of the electric vehicle 1 is being charged, the process goes to step 52. If the control unit determines the battery 6 of the electric vehicle 1 is not being charged, the process ends.

In step 52, the control unit 14 controls the first clutch 12 to disconnect the electric motor 2 with the axle 3 and then the control unit 14 controls the second clutch 13 to connect the electric motor 2 with the cleaning device 16. Then the process goes to step 53.

In step 53, the control unit 14 activates the cleaning device 16 by controlling the inverter 5. More specifically the control unit 14 controls the inverter 5 to draw electric current from the battery 6 and sends it to the electric motor 2 in order to activate the cleaning device 16. In a case that the cleaning device 16 is a blower, the electric motor 2 generates positive pressure to blow air towards the apertures 17c1, 17c2, 17d1, 17e1 on the third pipe 17c and the fourth pipe 17d in order to blow dust, rubbish, air or so forth on the seat cushions 8a, seatbacks 8b, windows 41, dashboard 42, vehicle floor or so forth (see FIG. 4). On the other hand, in a case that the cleaning device 16 is a vacuum, the electric motor generates negative pressure to suck air in the vehicle cabin through the apertures 17c1, 17c2, 17d1, 17d2 on the third pipe 17c and the fourth pipe 17d in order to suck dust, rubbish, air or so forth on the seat cushions 8a, seatbacks 8b, windows 41, dashboard 42, vehicle floor and so forth (see FIG. 4). Then the process goes to step 54.

In step 54, the control unit 14 determines if the cleaning process finishes. The control unit 14 may determine if the cleaning process has finished by comparing a duration time of the cleaning process with a predetermined time. The control unit 14 may determine if the cleaning process has finished based on inputs from various sensors such an on-board camera. If the control unit 14 determines that the cleaning process has finished, the process goes to step 55. If the control unit 14 determines that the cleaning process has not yet finished, the process goes back to step 54.

In step 55, the control unit 14 controls the inverter 5 to deactivate the cleaning device 16. More specifically, the control unit 14 stops the inverter 5 from sending electric current from the battery 6 to the electric motor 2.

In step 56, the control unit 14 control the first clutch 12 and the second clutch 13 to roll back to the state as they were. More specifically, the control unit 14 controls the second clutch 13 to disconnect the electric motor 2 with the cleaning device 16 and then the control unit 14 controls the first clutch 12 to connect the electric motor 2 with the axle 3. Then the process ends.

The electric vehicle 1 of the first embodiment allows the cleaning device 16 to make the vehicle cabin cleaner because the cleaning device 16 makes use of the electric motor 2 as a power source so that the cleaning device 16 can get more power to clean the vehicle cabin than an existing cleaning device with a dedicated motor which is activated with low voltage.

Figure 6:
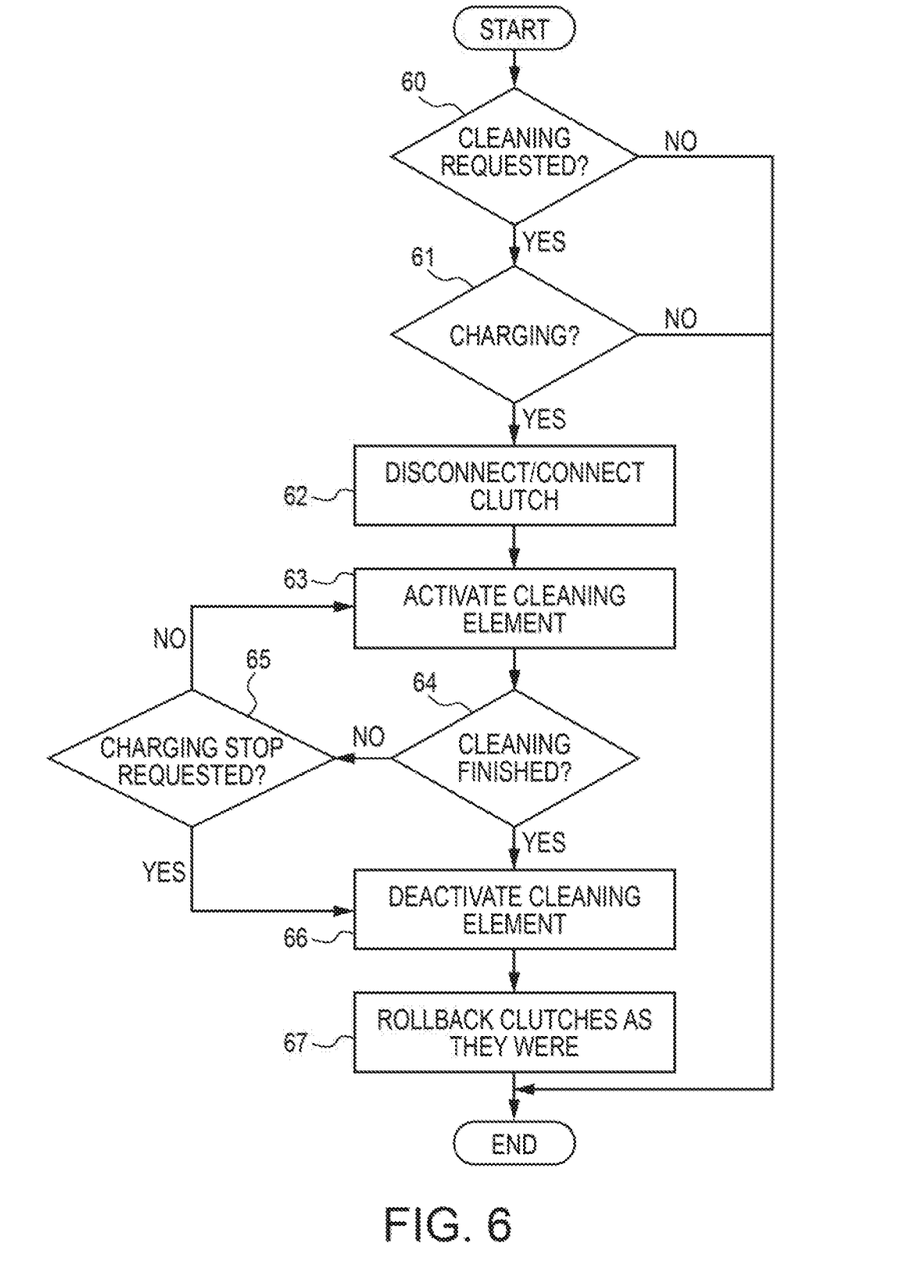
FIG. 6 is a flow chart of a second embodiment.

FIG. 6 shows a flow chart of a second embodiment. In the first embodiment, the cleaning device 16 is activated while the battery 6 is being charged. A user may sometimes stop charging a battery 6 in the middle of the charging process due to his/her emergency. Also the charging station 9 may suddenly stop due to blackout. If the charging stops in the middle of the charging process but the cleaning process continues, the battery power may be wasted by the cleaning device 16, which may shorten distance the electric vehicle can go. The second embodiment resolves such an issue.

In step 60, the control unit 14 determine if the cabin cleaning is requested. If the control unit 14 determines that the cabin cleaning is requested, the process goes to step 61. If the control unit 14 determines that the cabin cleaning is not requested, the process ends. The control unit 14 may determine if the cabin cleaning is requested by checking if the cleaning request button 8c installed near the connector 8 is pressed (see FIG. 2). The control unit 14 may determine if the cabin cleaning is requested by checking if the cleaning request button 8c displayed on the infotainment system installed on the dashboard 42 of the electric vehicle 1 is pressed. The control unit 14 may determine if the cabin cleaning is requested if the infotainment system, through a telematics system embedded in an infotainment system, receives the cleaning request from the user's mobile terminal such as a cell phone, smartphone, tablet computer, laptop computer, desktop computer and so forth. The control unit 14 may determine if the cabin cleaning is requested by checking if timing has come, when a user set to get the vehicle cabin cleaned once every two charging. The control unit 14 may determine if the cabin cleaning is requested by checking the charging plug 11 of the charging station 9 is inserted into the connector 8. The control unit 14 may determine if the cabin cleaning is requested based on the cleanliness of the electric vehicle, which is determined by sensors including on-board camera.

In step 61, the control unit 14 determines if the battery 6 of the electric vehicle 1 is being charged. The control unit 14 may determine if the battery 6 of the electric vehicle 1 is being charged by communicating with the charging station 9 through the connector 8, the charging cable 10 and the charging plug 11. The control unit 14 may determine if the battery 6 of the electric vehicle 1 is being charged by checking state of charge of the battery 6. If the control unit 14 determines the battery 6 of the electric vehicle 1 is being charged, the process goes to step 62. If the control unit 14 determines the battery 6 of the vehicle is not being charged, the process ends.

In step 62, the control unit 14 controls the first clutch 12 to disconnect the electric motor 2 with the axle 3 and then the control unit 14 controls the second clutch 13 to connect the electric motor 2 with the cleaning device 16. Then the process goes to 63.

In step 63, the control unit 14 activates the cleaning device 16 by controlling the inverter 5. More specifically the control unit 14 controls the inverter 5 to draw electric current from the battery 6 and sends it to the electric motor 2 in order to activate the cleaning device 16. In a case that the cleaning device 16 is a blower, the electric motor 2 generates positive pressure to blow air towards the apertures 17*c*1, 17*c*2, 17*d*1, 17*e*1 on the third pipe 17*c* and the fourth pipe 17*d* in order to blow dust, rubbish, air or so forth on the seat cushions 8*a*, seatbacks 8*b*, windows 41, dashboard 42, vehicle floor or so forth (see FIG. 4). On the other hand, in a case that the cleaning device 16 is a vacuum, the electric motor 2 generates negative pressure to suck air in the vehicle cabin through the apertures 17*c*1, 17*c*2, 17*d*1, 17*d*2 on the third pipe 17*c* and the fourth pipe 17*d* in order to suck dust, rubbish, air or so forth on the seat cushions 8*a*, seatbacks 8*b*, windows 41, dashboard 42, vehicle floor or so forth (see FIG. 4). Then the process goes to step 64.

In step 64, the control unit 14 determines if the cleaning process finishes. The control unit may determine if the cleaning process has finished by comparing time from the start of the cleaning with predetermined time. The control unit 14 may determine if the cleaning process has finished based on inputs from various sensors such an on-board camera. If the control unit 14 determines that the cleaning process has finished, the process goes to step 66. If the control unit 14 determines that the cleaning has not yet finished, the process goes back to step 65.

In step 65, the control unit 14 determines if there is a request to stop charging. The control unit 14 may determines if there is the request to stop charging by communicating the charging station 9. If the control unit 14 determines that there is the request to stop charging, the process goes to 66. If the control unit 14 determines that there is no request to stop charging, the process goes back to 63.

In step 66, the control unit 14 controls the inverter 5 to deactivate the cleaning device 16. More specifically, the control unit 14 stops the inverter 5 from sending electric current from the battery 6 to the electric motor 2. Then the process goes to step 67.

In step 67, the control unit 14 controls the first clutch 12 and the second clutch 13 to roll back to the state as they were. More specifically, the control unit 14 controls the second clutch 13 to disconnect the electric motor 2 with the cleaning device 16 and then the control unit 14 controls the first clutch 12 to connect the electric motor 2 with the axle 3. Then the process ends.

The electric vehicle 1 of the second embodiment prevents the cleaning device 16 from wasting battery power when the charging suddenly stops.

Figure 7:
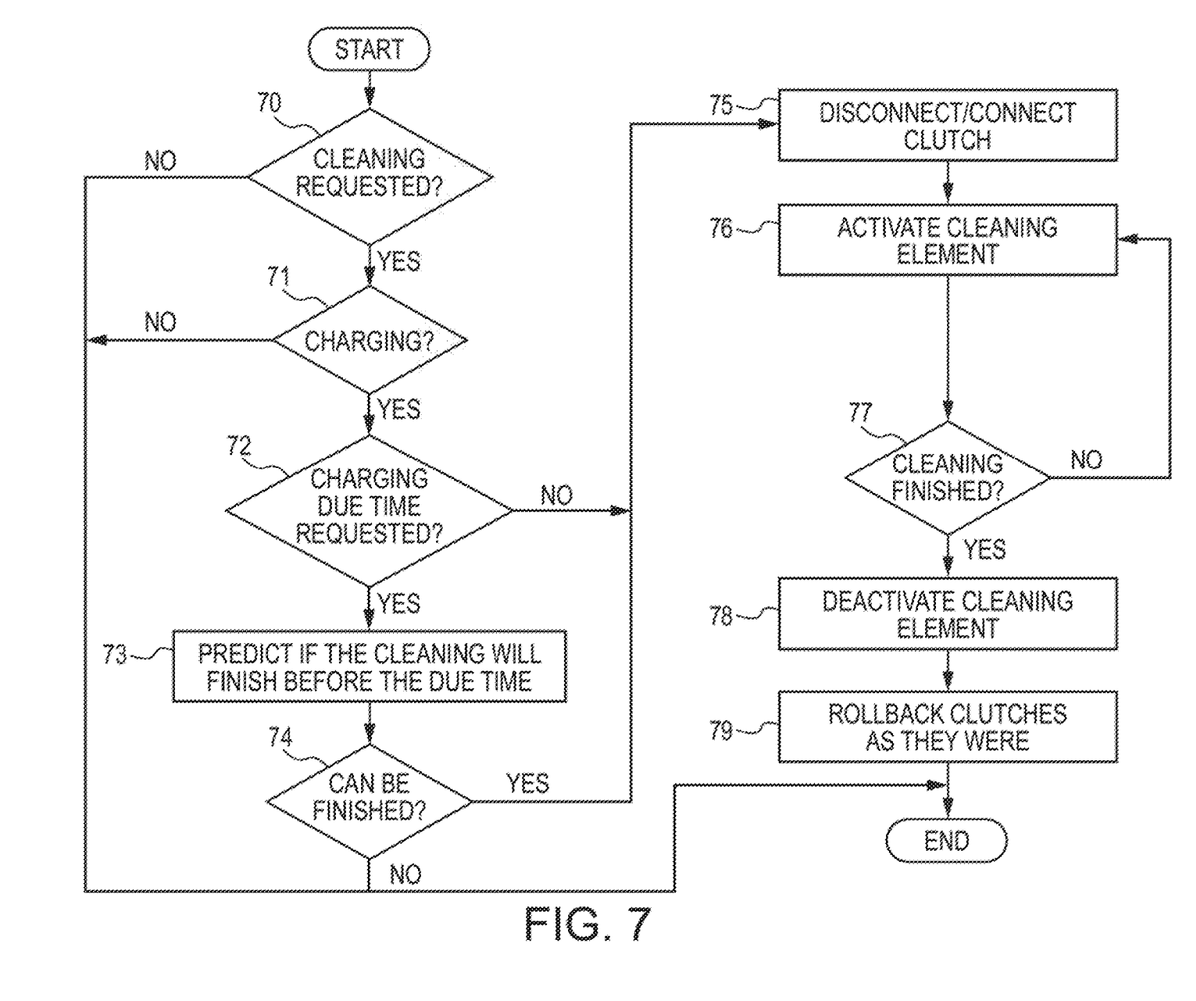
FIG. 7 is a flow chart of a third embodiment.

FIG. 7 shows a flow chart of a third embodiment. A user sometimes may think that the user wants to leave a charging station by a certain time such as by 7 AM or in 8 hours from now, because the user has an appointment or has to go to work. In that case, the cleaning process may not finish within the limited period of time and may continue regardless of the user's wish to use the electric vehicle at the moment. The third embodiment resolves such an issue.

In step 70, the control unit 14 determines if the cabin cleaning is requested. If the control unit 14 determines that the cabin cleaning is requested, the process goes to step 71. If the control unit 14 determines that the cabin cleaning is not requested, the process ends. The control unit 14 may determine if the cabin cleaning is requested by checking if the cleaning request button 8*c* installed near the connector is pressed (see FIG. 2). The control unit 14 may determine if the cabin cleaning is requested by checking if another cleaning request button displayed on the infotainment system installed on the dashboard 42 of the electric vehicle 1 is pressed. The control unit 14 may determine if a telematics system embedded in the infotainment system receives the cleaning request from the user's mobile terminal such as a cell phone, smartphone, tablet computer, laptop computer, desktop computer or so forth. The control unit 14 may determine if the cabin cleaning is requested by checking if timing has come, when a user set to get the vehicle cabin cleaned once every two charging. The control unit 14 may determine if the cabin cleaning is requested by checking the charging plug 11 of the charging station 9 is inserted into the connector 8. The control unit 14 may determine if the cabin cleaning is requested based on the cleanliness of the electric vehicle, which is determined by sensors including on-board camera. Then the process goes to 71.

In step 71, the control unit 14 determines if the battery 6 of the electric vehicle 1 is being charged. The control unit 14 may determine if the battery 6 of the electric vehicle 1 is being charged if the battery 6 of the electric vehicle 1 is being charged by communicating with the charging station 9 through the connector 8, charging plug 11 and the charging cable 10. The control unit 14 may determine if the battery 6 of the electric vehicle 1 is being charged by checking state of charge (SOC) of the battery 6. If the control unit 14 determines the battery 6 of the electric vehicle 1 is being charged, the process goes to step 72. If the control unit 14 determines the battery 6 of the electric vehicle 1 is not being charged, the process ends.

In step 72, the control unit 14 determines if the due time by when the charging of the battery 6 should complete is requested. For example, the due time may be set at 7 AM or in 8 hours from the present time. The control unit 14 may get the due time by communicating with the charging station 9. The control unit 14 determines if the due time is requested, then the process goes to step 73. The control unit 14 determines if the due time is not requested, the process goes to step 75.

In step 73, the control unit 14 predicts if the cleaning process can be finished by the due time. The prediction may be made based on a remaining time to the due time, charging time to fully charge the battery 6, and cleaning time for the cleaning process. For example, the control unit 14 determines whether the remaining time to the due time is more than the charging time to fully charge the battery 6 first. If the remaining time is more than the charging time, then the remaining time subtracted by the charging time is more than the time for the cleaning process. If the remaining time subtracted by the charging time is more than the cleaning time for the cleaning process, then the control unit 14 predicts the cleaning process can be finished by the due time. Then the process goes to step 74.

In step 74, the control unit 14 determines if the cleaning process can be finished by the due time based on the prediction made in step 73. In the control unit 14 determines that the cleaning process can be finished by the due time, the process goes to 75. If the control unit 14 determines that the cleaning process can not be finished because there is not enough time to complete the cleaning process, the process ends.

In step 75, the control unit 14 controls the first clutch 12 to disconnect the electric motor 2 with the axle 3 and then the control unit 14 controls the second clutch 13 to connect the electric motor 2 with the cleaning device 16. Then the process goes to 76.

In step 76, the control unit 14 activates the cleaning device 16 by controlling the inverter 5. More specifically the control unit 14 controls the inverter 5 to draw electric current from the battery 6 and sends it to the electric motor 2 in order to activate the cleaning device 16. In a case that the cleaning device 16 is a blower, the electric motor 2 generates positive pressure to blow air towards the apertures 17c1, 17c2, 17d1, 17e1 on the third pipe 17c and the fourth pipe 17d in order to blow dust, rubbish, air or so forth on the seat cushions 8a, seatbacks 8b, windows 41, dashboard 42, vehicle floor or so forth (see FIG. 4). On the other hand, in a case that the cleaning device 16 is a vacuum, the electric motor 2 generates negative pressure to suck air in the vehicle cabin through the apertures 17c1, 17c2, 17d1, 17d2 on the third pipe 17c and the fourth pipe 17d in order to suck dust, rubbish, air or so forth on the seat cushions 8a, seatbacks 8b, windows 41, dashboard 42, vehicle floor or so forth (see FIG. 4). Then the process goes to step 77.

In step 77, the control unit 14 determines if the cleaning process has finished. The control unit 14 may determine if the cleaning process has finished by comparing time from the start of the cleaning with predetermined time. The control unit 14 may determine if the cleaning process has finished based on inputs from various sensors such an on-board camera. If the control unit 14 determines that the cleaning process has finished, the process goes to step 78. If the control unit determines that the cleaning has not yet finished, the process goes back to step 76.

In step 78, the control unit 14 controls the inverter 5 to deactivate the cleaning device 16. More specifically, the control unit 14 stops the inverter 5 from sending electric current from the battery 6 to the electric motor 2. Then the process goes to step 79.

In step 79, the control unit 14 controls the first clutch 12 and the second clutch 13 to roll back to the state as they were. More specifically, the control unit 14 controls the second clutch 13 to disconnect the electric motor 2 with the cleaning device 16 and then the control unit 14 controls the first clutch 12 to connect the electric motor 2 with the axle 3. Then the process ends.

The electric vehicle 1 of the third embodiment prevents the cleaning device 16 from being activated when the cleaning process will not be finished by the due time the user sets up.

Figure 8:
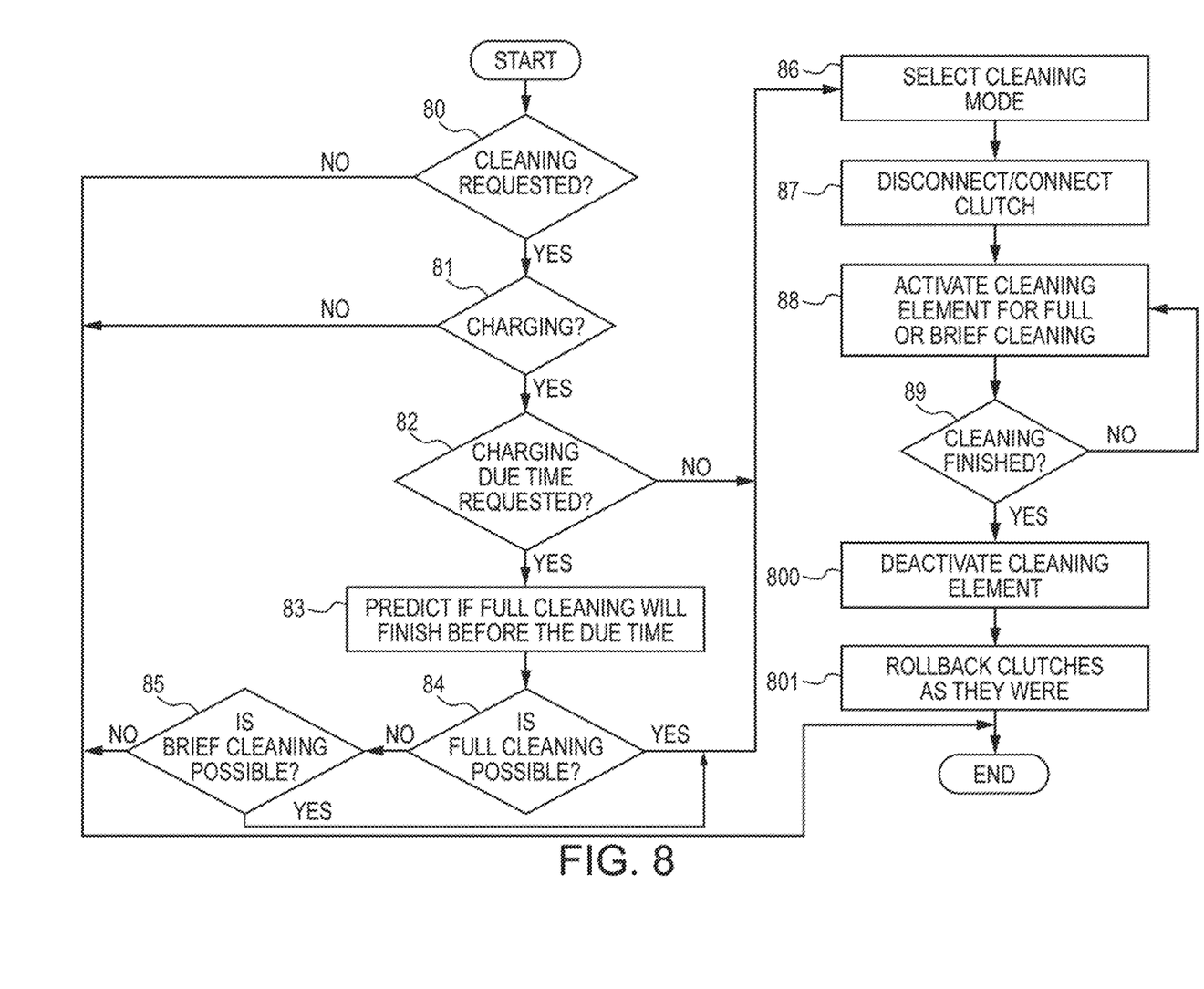
FIG. 8 is a flow chart of a fourth embodiment.

FIG. 8 shows a flow chart of the fourth embodiment. In the third embodiment, the cleaning device 16 is not activated when the cleaning process can not be finished by the due time the user sets up. The user may think that a brief cleaning process is good enough for now rather than a full cleaning process. A brief cleaning process may be cleaning process with a blower and a vacuum but without water. The full cleaning process may be cleaning process with water as well as the blower and the vacuum. The full cleaning process can clean the vehicle cabin more than the brief cleaning process but it takes more time than the brief cleaning process because water is used and thus dry process is needed. On the other hand, the brief cleaning process can clean the vehicle cabin less than the full cleaning process but it takes less time than the full cleaning process because there is no water spraying and drying process. The fourth embodiment resolves such an issue.

In the fourth embodiment, a spraying device 15a is additionally used as the auxiliary cleaning device 15 in order to clean the vehicle cabin with the full cleaning process. The spraying device 15a includes a tank containing water, a pump with a dedicated motor pumping the water, and a hose that leads the water to its outlet thereof. The water may be rainwater or tap water. The water may be heated by the HVAC before used. The water may include liquid soap or detergent to clean the vehicle more efficiently. The water may include disinfectant. The hose may be disposed inside of the pipes 17 and their outlets may be disposed at the same places as the outlets 43, 44, 46 and the apertures 17c1, 17d1 where the air from the cleaning device 16 comes out. The spraying device 15a may be controlled by the control unit 14.

In step 80, the control unit 14 determines if the cabin cleaning is requested. If the control unit 14 determines that the cabin cleaning is requested, the process goes to step 81. If the control unit 14 determines that the cabin cleaning is not requested, the process ends. The control unit 14 may determine if the cabin cleaning is requested by checking if the cleaning request button 8c installed near the connector 8 is pressed (see FIG. 2). The control unit 14 may determine if the cabin cleaning is requested by checking if another cleaning request button displayed on the infotainment system installed on the dashboard 42 of the electric vehicle 1 is pressed. The control unit 14 may determine if a telematics system embedded in the infotainment system receives the cleaning request from the user's mobile terminal such as a cell phone, smartphone, tablet computer, laptop computer, desktop computer or so forth. The control unit 14 may determine by checking if timing has come, when a user set to get the vehicle cabin cleaned once every two charging. The control unit 14 may determine if the cabin cleaning is requested by checking the charging plug 11 of the charging station 9 is inserted into the connector 8. The control unit 14 may determine if the cabin cleaning is requested based on the cleanliness of the electric vehicle, which is determined by sensors including on-board camera. Then the process goes to step 81.

In step 81, the control unit 14 determines if the battery 6 of the electric vehicle 1 is being charged. The control unit 14 may determine if the battery 6 of the electric vehicle 1 is being charged by communicating with the charging station 9 through the connector 8, the charging plug 11 and the charging cable 10. The control unit 14 may determine if the battery 6 of the electric vehicle 1 is being charged by checking state of charge of the battery 6. If the control unit 14 determines the battery 6 of the electric vehicle 1 is being charged, the process goes to step 82. If the control unit 14 determines the battery 6 of the electric vehicle 1 is not being charged, the process ends.

In step 82, the control unit 14 determines if the due time by when the charging of the battery 6 should complete is requested. For example, the due time may be set to 7 AM or in 8 hours from the present time. The control unit 14 may get the due time by communicating with the charging station 9. The control unit 14 determines if the due time is requested, the process goes to step 83. The control unit 14 determines if the due time is not requested, the process goes to step 86.

In step 83, the control unit 14 predicts if the brief cleaning process without water or the full cleaning process with water can be finished by the due time. The prediction may be made based on remaining time to the due time, charging time to fully charge the battery 6 and cleaning time for the brief/full cleaning process. For example, the control unit 14 determines whether the remaining time to the due time is more than the charging time to fully charge the battery 6 first. If the remaining time is more than the charging time, then the remaining time subtracted by the charging time is more than the cleaning time for the brief cleaning process or full cleaning process. If the remaining time subtracted by the charging time is more than the cleaning time for the brief cleaning process or full cleaning process, then the control unit 14 predicts the brief cleaning process or both the brief cleaning process and full cleaning process can be finished by the due time. Then the process goes to step 84.

In step 84, the control unit 14 determines if the full cleaning process with water can be finished by the due time based on the prediction made in step 83. If the control unit 14 determines that the full cleaning process can be finished by the due time, the process goes to step 86. If the control unit determines that the full cleaning process can not be finished, the process goes to step 85.

In step 85, the control unit 14 determines if the brief cleaning process without water can be finished by the due time based on the prediction made in Step 83. If the control unit 14 determines that the brief cleaning process without water can be finished by the due time, the process goes to step 86. If the control unit 14 determines that the brief cleaning process without water can not be finished by the due time, the process ends.

In step 86, the control unit 14 sets the cleaning process to either one of the full cleaning process and the brief cleaning process based on the determination in step 84 and 86. Then the process goes to step 87.

In step 87, the control unit 14 controls the first clutch 12 to disconnect the electric motor 2 with the axle 3 and then the control unit 14 controls the second clutch 13 to connect the electric motor 2 with the cleaning device 16. Then the process goes to 88.

In step 88, the control unit 14 activates the cleaning device 16 by controlling the inverter 5. More specifically the control unit 14 controls the inverter 5 to draw electric current from the battery 6 and sends it to the electric motor 2 in order to activate the cleaning device 16. In a case that the cleaning device 16 is a blower, the electric motor 2 generates positive pressure to blow air towards the apertures 17c1, 17c2, 17d1, 17e1 on the third pipe 17c and the fourth pipe 17d in order to blow dust, rubbish, air or so forth on the seat cushions 8a, seatbacks 8b, windows 41, dashboard 42, vehicle floor or so forth (see FIG. 4). On the other hand, in a case that the cleaning device 16 is a vacuum, the electric motor 2 generates negative pressure to suck air in the vehicle cabin through the apertures 17c1, 17c2, 17d1, 17d2 on the third pipe 17c and the fourth pipe 17d in order to suck dust, rubbish, air or so forth on the seat cushions 8a, seatbacks 8b, windows 41, dashboard 42, vehicle floor or so forth (see FIG. 4). When the control unit 14 selects the full cleaning process, the control unit 14 activates the blower, the vacuum and the spraying device. In the full cleaning process, the control unit 14 may control to blow or vacuum dust or rubbish first and then to spray water to wash things in the vehicle cabin and then the HVAC 21 dries residue of water in the vehicle cabin resulting from the full cleaning process. On the other hand, if the control unit 14 selects the brief cleaning process, the control unit only activates the blower and the vacuum.

In step 89, the control unit 14 determines if the cleaning process has finished. The control unit 14 may determine if the cleaning process has finished by comparing time from the start of the cleaning with predetermined time. The control unit 14 may determine if the cleaning has finished based on inputs from various sensors such an on-board camera. If the control unit 14 determines that the cleaning process has finished, the process goes to step 800. If the control unit determines that the cleaning process has not yet finished, the process goes back to step 88.

In step 800 the control unit 14 controls the inverter 5 to deactivate the cleaning device 16 and the auxiliary cleaning device 15. Then the process goes to step 801.

In step 801, the control unit 14 controls the first clutch 12 and the second clutch 13 to roll back to the state as they were. More specifically, the control unit 14 controls the second clutch 13 to disconnect the electric motor 2 with the cleaning device 16 and then the control unit 14 controls the first clutch 12 to connect the electric motor 2 with the axle 3. Then the process ends.

The electric vehicle 1 of the fourth embodiment allows the cleaning device 16 to clean the vehicle cabin with the brief cleaning process without water when there is not enough time to conduct the full cleaning process by the due time. On the other hand, the electric vehicle 1 of the fourth embodiment allows the cleaning device to clean the vehicle cabin with the full cleaning process with water when there is enough time to complete the full cleaning process by the due time.

Other embodiments are also possible. For example, the control unit 14 moves the first clutch 12 and the second clutch 13 in the embodiments above while charging the battery 6, however the control unit 14 may move the first clutch 12 and the second clutch 13 to activate the cleaning device 16 at anytime when the electric vehicle 1 is not moving. For example, the cleaning device 16 as a vacuum may be activated for a short period of time to remove odor in the cabin when the electric vehicle 1 is waiting for a passenger to get in. If the electric vehicle 1 is an autonomous vehicle, the cleaning device 16 as a vacuum may be activated while the electric vehicle stops for red light of a traffic signal if no passengers are in the electric vehicle 1. Although the cleaning device 16 can not be used while moving, the auxiliary cleaning device 15 may be used while moving. For example, the auxiliary cleaning device 15 as a vacuum can be used during moving or stopping to suck the cool or warm air from the HVAC 21 to directly cool or warm a passenger. Because the air from the HVAC 21 is sucked by the auxiliary cleaning device 15, the air in the vehicle cabin goes towards the passenger directly. It can cool or warm the passenger efficiently or it can prevent odor of the passenger from spreading to the vehicle cabin. In that case, the auxiliary cleaning device 15 may be activated only when the passenger is detected on the front seat or the rear seat by a sensor like a camera. The blower may send heated air to the pipes 17a-17g so that the heated air can remove germs or viruses in the vehicle cabin. The heated air may be generated by the HVAC 21.

In the embodiments above, the present disclosure was explained as an electric vehicle with a cleaning device, however the present disclosure may be a cleaning system for a vehicle cabin.

Figure 9:
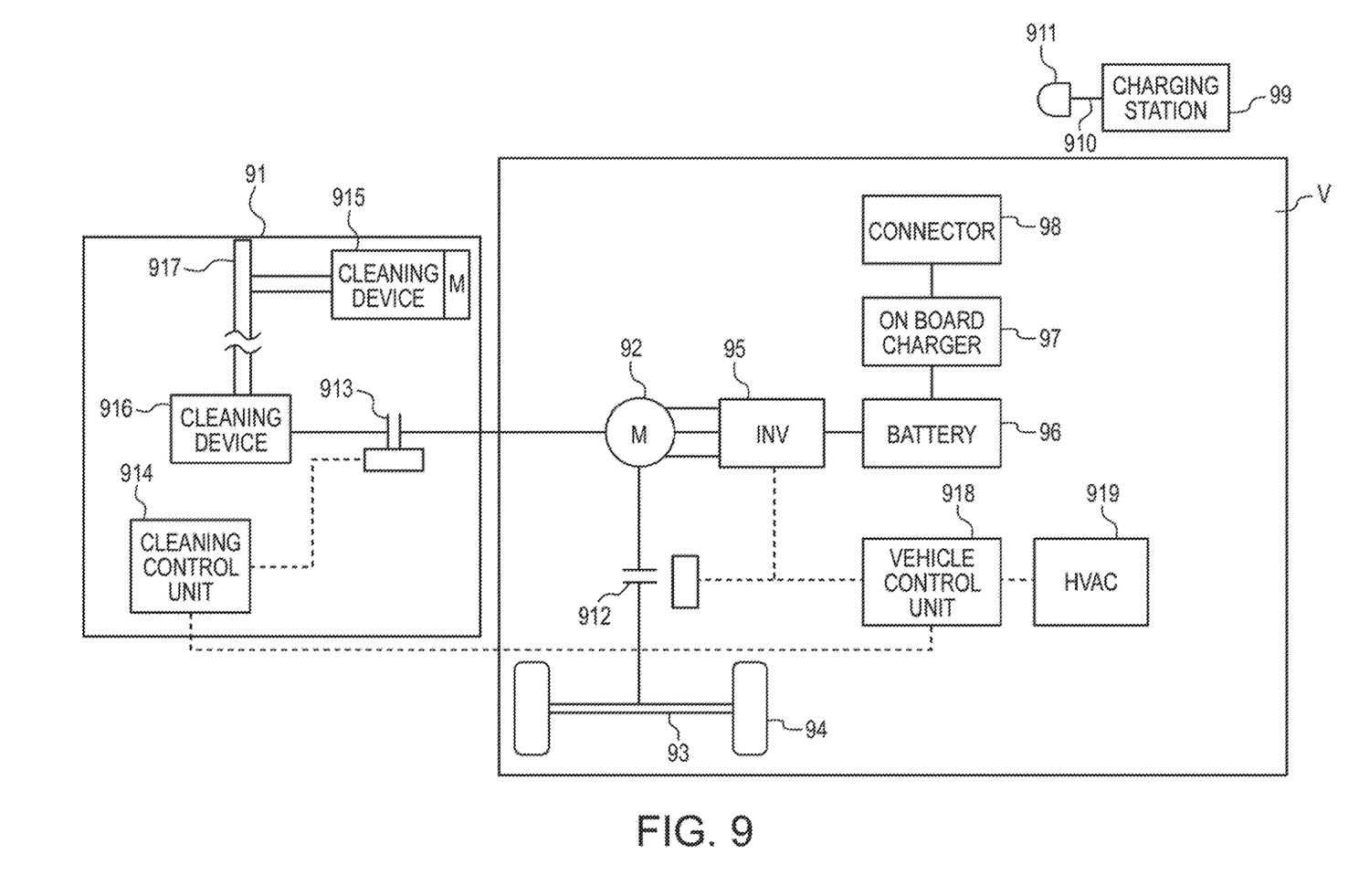
FIG. 9 is an overall diagram of a cleaning system for a vehicle cabin regarding the present disclosure.

FIG. 9 shows a cleaning system 91 for a vehicle cabin of an electric vehicle V. The cleaning system 91 includes a cleaning device 916, cleaning control unit 914 and a system-side clutch 913 that connects or disconnects an electric motor 92 with the cleaning device 916. The cleaning system 91 may include an auxiliary cleaning device 915 with or without a dedicated motor M such as a spraying device, a vacuum or a blower. The cleaning control unit 914 directly controls cleaning device 916 or the auxiliary cleaning device 915 and the system-side clutch 913. The cleaning control unit 914 indirectly controls devices associated with the electric vehicle V such as a electric motor 92, an inverter 95, a battery 96, an on-board charger 97, a connector 98, an HVAC 919, a charging station 909 having a charging plug 911 and a charging cable 910 in between, and a vehicle-side clutch 912 between the electric motor 92 and an axle 93 having wheels 94 via a vehicle control unit 918. For example, the cleaning control unit 914 controls the system-side clutch 913 to connect or disconnect the electric motor 92 with the cleaning device 916 and sends a signal to the vehicle control unit 918 to connect or disconnect the vehicle-side clutch 92 with the axle 93. The cleaning system 91 is controlled in a similar manner to the foregoing embodiments by the cleaning control device 916 in cooperation with the vehicle control unit 918. The cleaning system 91 may be inside of the electric vehicle V or outside of the electric vehicle. The pipe 917 may be installed in the vehicle cabin to clean the vehicle cabin or on an exterior of the electric vehicle V to clean the exterior of the electric vehicle.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. An electric vehicle comprising:
    an axle;
    an electric motor;
    a cleaning device;
    a heating, ventilation and air conditioning unit; and
    a clutch that connects the electric motor to the cleaning device while disconnecting the axle, wherein ducting for the heating, ventilation and air conditioning unit is manipulated for the cleaning device when connected with the electric motor.

2. The electric vehicle of claim 1, wherein positive or negative pressure is applied by the cleaning device through the ducting for the heating, ventilation and air conditioning unit.

3. The electric vehicle of claim 2, wherein the positive pressure applied by the cleaning device through the ducting for the heating, ventilation and air conditioning unit blows dust, rubbish, or air on seat cushions, seatbacks, windows dashboard or vehicle floor.

4. The electric vehicle of claim 2, wherein the negative pressure applied by the cleaning device through the ducting for the heating, ventilation and air conditioning unit pulls dust, rubbish, or air from seat cushions, seatbacks, windows dashboard or vehicle floor.

5. The electric vehicle of claim 1, comprising a sprayer.

6. The electric vehicle of claim 5, wherein the sprayer is coupled to the heating, ventilation and air conditioning unit heating liquid used by the sprayer device.

7. The electric vehicle of claim 6, comprising a control unit actuating the sprayer device and heating, ventilation and air conditioning unit.

8. The electric vehicle of claim 1, wherein hot air is provided through the heating, ventilation and air conditioning unit killing germs or viruses.

9. A cleaning system for a cabin of a vehicle comprising:
    a motor;
    a heating, ventilation and air conditioning unit installed in the cabin; and
    a cleaning device providing pressure within ducting for the heating, ventilation and air conditioning unit; wherein the cleaning device is actuated when a clutch within the vehicle switches a connection from the motor to an axle to the motor to the cleaning device.

10. The cleaning system of claim 9, wherein the pressure is positive or negative pressure applied by the cleaning device through the ducting for the heating, ventilation and air conditioning unit.

11. The cleaning system of claim 9, comprising at least one seat having a cushion portion and a back portion, wherein the ducting for the heating, ventilation and air conditioning unit is distributed within the at least one seat.

12. The cleaning system of claim 11, wherein the back portion comprises a louver for adjusting a direction of outflow or intake.

13. The cleaning system of claim 12, wherein the outflow is at least one of air, water and powder.

14. The cleaning system of claim 12, wherein the intake is at least one of air, water and powder.

15. The cleaning system of claim 11, wherein the pressure is different for cushion portion and the back portion.

16. The cleaning system of claim 9, wherein the ducting for the heating, ventilation and air conditioning unit has an outlet path or intake path outside the vehicle.

17. A method for cleaning a cabin of a vehicle comprising:
    connecting a motor with a cleaning device, and
    providing negative or positive pressure within ducting for a heating, ventilation and air conditioning unit through the cleaning device to clean the cabin of the electric vehicle; wherein connecting the motor with the cleaning device comprises actuating a clutch to switch from a connection from the motor to an axle to the motor to the cleaning device.

18. The method for cleaning the cabin of the vehicle of claim 17, wherein positive pressure through the ducting blows dust, rubbish, or air on seat cushions, seatbacks, windows dashboard or vehicle floor.

19. The method for cleaning the cabin of the vehicle of claim 17, wherein negative pressure through the ducting pulls dust, rubbish, or air from seat cushions, seatbacks, windows dashboard or vehicle floor.

\* \* \* \* \*